United States Patent [19]
Ohms

[11] Patent Number: 5,095,416
[45] Date of Patent: Mar. 10, 1992

[54] PUSH-PULL CONVERTER CURRENT LIMITER

[75] Inventor: Franz Ohms, Oberrot-Hausen, Fed. Rep. of Germany

[73] Assignee: ANT Nachrichtentechnik GmbH, Backnang, Fed. Rep. of Germany

[21] Appl. No.: 544,516

[22] Filed: Jun. 27, 1990

[30] Foreign Application Priority Data

Jul. 1, 1989 [DE] Fed. Rep. of Germany ....... 3921724

[51] Int. Cl.$^5$ .................................... H02M 7/519
[52] U.S. Cl. .................................... 363/97; 363/26; 363/134
[58] Field of Search .................. 363/24, 25, 26, 97, 363/134

[56] References Cited

U.S. PATENT DOCUMENTS

| | | | |
|---|---|---|---|
| 3,870,943 | 3/1975 | Weischedel et al. | 363/26 |
| 4,002,963 | 1/1977 | Hunter | 363/80 |
| 4,190,882 | 2/1980 | Chevalier et al. | 363/97 |
| 4,293,902 | 10/1981 | White | 363/26 |
| 4,404,623 | 9/1983 | Jourdan | 363/97 |
| 4,408,267 | 10/1983 | Pruitt | 363/25 |
| 4,425,613 | 1/1984 | Shelly | 363/26 |
| 4,443,840 | 4/1984 | Geissler et al. | 363/24 |
| 4,542,440 | 9/1985 | Chetty et al. | 363/24 |
| 4,694,383 | 9/1987 | Nguyen et al. | 363/98 |
| 4,739,462 | 4/1988 | Farnsworth et al. | 363/90 |
| 4,816,982 | 3/1989 | Severinsky | 363/80 |
| 4,864,482 | 9/1989 | Quazi et al. | 363/26 |
| 4,878,026 | 10/1989 | Moreau et al. | 363/97 |
| 4,885,675 | 12/1989 | Henze et al. | 363/26 |
| 4,890,214 | 12/1989 | Yamamoto | 363/97 |
| 4,974,141 | 11/1990 | Severinsky et al. | 363/89 |

FOREIGN PATENT DOCUMENTS 3020745 12/1981 Fed. Rep. of Germany .
0077958 5/1983 Fed. Rep. of Germany .
56-166771 12/1981 Japan .

OTHER PUBLICATIONS

"Design of Power Transformers for Space TWTA's"; Tech-Notes, Watkins Johnson Co., Palo Alta, CA., U.S.A.

Primary Examiner—Jeffrey Sterrett
Attorney, Agent, or Firm—Spencer & Frank

[57] ABSTRACT

Method and apparatus for output current limitation of a push-pull d.c. voltage converter. The input current of the push-pull d.c. voltage converter is detected and integrated each switching cycle of push-pull switches in the current paths leading to the transformer of the converter. The integrated signal together with a reference signal are utilized to form a control signal for a pulse frequency modulator, the output of which controls the on-periods of the push-pull switches. The arithmetic mean of the output current of the push-pull d.c. voltage converter is thereby kept constant without additional power elements. Operation with a boost-type switch controller as a pre-regulator becomes possible without problems.

7 Claims, 4 Drawing Sheets

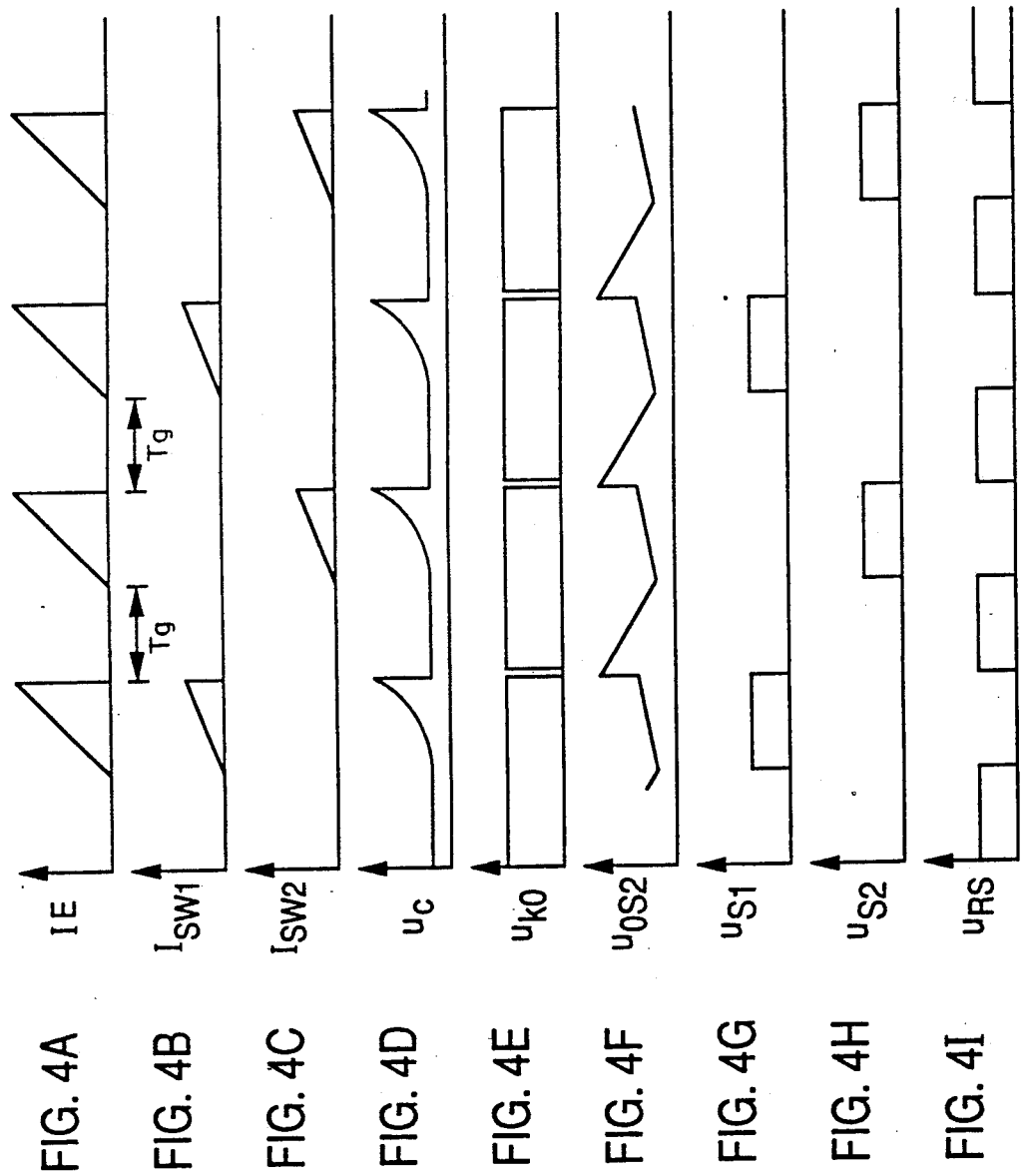

PUSH-PULL CONVERTER CURRENT LIMITER

CROSS REFERENCE TO RELATED APPLICATION

This application claims the priority of application Ser. No. P 39 21 724.8, filed July 1, 1989, in the Federal Republic of Germany, the subject matter of which is incorporated herein by reference.

BACKGROUND OF THE INVENTION

The present invention relates to a current limiting method in a push-pull d.c. voltage converter and to an apparatus for implementing the method.

Methods are known for limiting the output current in a push-pull d.c. voltage converter. For example, a series controller or a buck-type switch controller can be connected to the input of a non-controlled push-pull d.c. voltage converter as disclosed in the article "Design of Power Transformers For Space TWTA's," appearing in Tech-notes, a periodical of Watkins Johnson Co., Palo Alto, Calif., U.S.A. Another way to limit the current is to configure the push-pull d.c. voltage converter to operate with pulse width control and equip the converter with a feedback connected feed coil as disclosed in German Patent No. 3,020,745. All three of the above versions have the decisive drawbacks that they reduce efficiency in normal operation and require additional space and weight for power elements, which is particularly unfavorable for satellite applications.

SUMMARY OF THE INVENTION

It is an object of the present invention to provide a novel current limitation method and apparatus for implementing the method in which the above noted drawbacks are minimized.

The above and other objects are accomplished according to the invention by the provision of a method for limiting output current in the context of a push-pull d.c. voltage converter including a transformer with a primary winding connected to a d.c. power supply for receiving an input current and a secondary winding connected to a load by way of rectifiers for passing an output current through the load; first and second current paths leading to the primary winding of the transformer; and first and second push-pull switches disposed, respectively, in the first and second current paths, each switch having a controllable switching cycle. The novel steps according to the inventive method include: generating a signal, in each of the first and second current paths, which is a function of the input current; integrating the signal which is a function of the input current during each switching cycle of the controllable switches; forming a control signal from the integrated signal and feeding the control signal to a pulse frequency modulator which is connected for controlling the push-pull switches so that on-periods of the push-pull switches, in dependence on the integrated signal, cause the output current to have a constant arithmetic mean and so that off-periods of the push-pull switches are kept constant.

According to a further aspect of the invention there is provided a push-pull d.c. voltage converter with current limitation, including: a d.c. power supply; a transformer having a primary winding connected to the power supply and receiving an input current therefrom, and a secondary winding connected to a load for passing an output current through the load; first and second current paths leading to said transformer; first and second push-pull switches disposed, respectively, in the first and second current paths, each switch having a control input and a controllable switching cycle which is controllable by a signal received at the control input; a current measuring converter disposed in each of the current paths, each current measuring converter having an output for producing a signal proportional to the input current of the transformer; an integration capacitor in communication with the outputs of the current measuring converters; charging means for controlling the charging of the integration capacitor during each switching cycle of the push-pull switches; a sawtooth signal means for providing a sawtooth signal with a superposed offset direct voltage; a comparator having a first input connected with the integration capacitor, a second input connected with the sawtooth signal means and an output for producing an output signal corresponding to a voltage difference between signals present at the first and second inputs of the comparator; and a pulse frequency modulator having an input connected to the output of the comparator and two outputs each connected to a respective one of the control inputs of the push-pull switches for controlling on-periods of the push-pull switches in dependence on the output signal of the comparator so that the output current through the load has constant arithmetic mean and so that off-periods of the push-pull switches are kept constant.

The method according to the invention has the advantage that no additional power elements are required. Another advantage is that the arithmetic mean of the output current of the push-pull d.c. voltage converter is set within one switching period of the push-pull switches. In contrast to peak current limitations, the arithmetic mean of the output current does not drop. A fold-back characteristic with its drawback of permitting the d.c. voltage converter to reach an operating point from which it cannot escape on its own can be avoided with the measures of the present invention. In the current limitation method according to the invention, a push-pull d.c. voltage converter can also be operated with a boost-type switch controller as a pre-regulator. The efficiency of a d.c. voltage converter constructed according to the steps of the invention is greater than 90% in the case of variations in the d.c. input voltage and with a boost-type switch controller as the pre-regulator.

The method of the invention will be described for an embodiment thereof and with reference to the drawing figures.

BRIEF DESCRIPTION OF THE DRAWINGS

FIGS. 4A through I depict timing diagrams of signals representing the operation of the push-pull converter.

DETAILED DESCRIPTION OF THE PREFERRED EMBODIMENT

Figure 1:
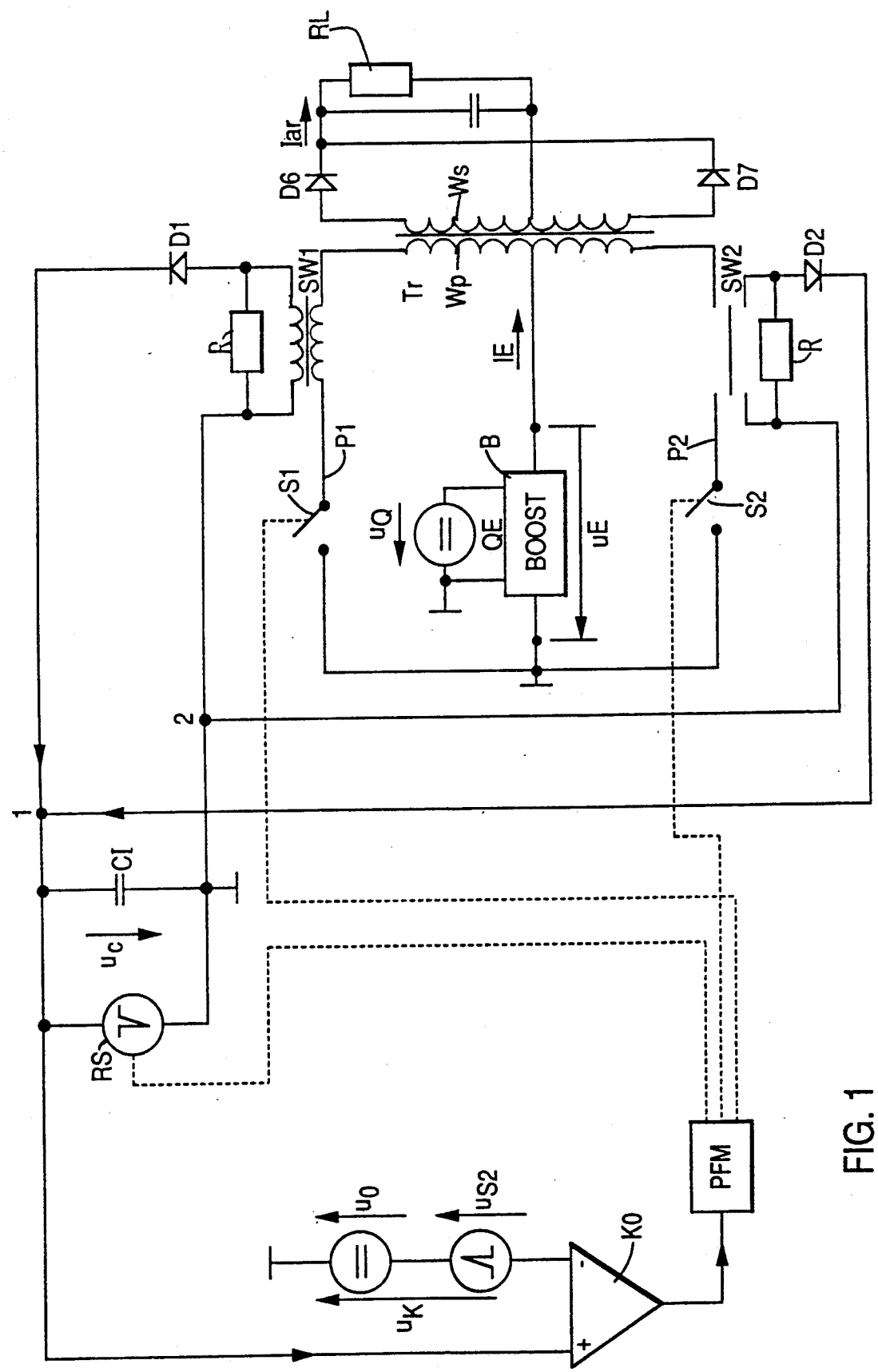
FIG. 1 is a basic circuit diagram for a push-pull converter provided with current limitation means according to the invention.

Referring to FIG. 1 there is shown a basic circuit diagram of a push-pull d.c. voltage converter according to the invention which includes an input direct voltage source QE provided as the power supply for a conventional boost-type switch controller B. Boost controller B serves as a preregulator for the push-pull d.c. voltage converter. Two push-pull switches S1 and S2, for example bipolar transistors, are connected in the primary circuit of a transformer Tr having a primary winding $W_p$ of the push-pull d.c. voltage converter. In the secondary circuit including the secondary winding Ws of transformer Tr, there are disposed rectifier elements D6 and D7 and a load resistance RL. By configuring the pre-regulator as a boost controller, the minimum input voltage UE for the push-pull d.c. voltage converter corresponds to the voltage $U_Q$ of source QE. In order to detect the input current of the push-pull d.c. voltage converter, current measuring converters SW1 and SW2 are provided in the respective current paths P1 and P2 of switches S1 and S2 leading to primary winding Wp of transformer Tr. The outputs of these current measurement converters SW1 and SW2, after being conducted via rectifier elements D1, D2, are each connected in parallel. Resistors R connected in parallel with converter SW1 and SW2 produce a voltage proportional to the currents sensed by these converters. The rectified output signals of the current measurement converters SW1 and SW2, as combined by this parallel connection, are fed at terminals 1 and 2 to an integration capacitor CI. Since switches S1 and S2 are controlled to become conductive in push-pull fashion by way of a pulse frequency modulator PFM, a signal proportional to the input current IE of the push-pull d.c. voltage converter is present for integration at integration capacitor CI. The charging process of integration capacitor CI is controlled by a reset device RS so that the integration takes place in each case during one switching cycle, that is, during the time the respective switch S1 or S2 is conductive. At the end of the respective switching cycle, integration capacitor CI is discharged rapidly so that it is available for a new integration process. Thus a voltage $U_C$ which is proportional to the momentary charge per turn-on pulse for switch S1 and S2, respectively, appears across integration capacitor CI. The signal $U_C$ is compared by means of a comparator KO with a reference voltage $U_K$ composed of a sawtooth voltage $U_{SZ}$ and an offset direct voltage $U_O$ superposed thereon. If voltage $U_C$ becomes higher than reference voltage $U_K$, the respective switch S1 or S2 presently in the ON state is controlled to be OFF.

The rise of input current IE of the push-pull d.c. voltage converter is determined by the stray inductance of transformer Tr. Here the current rises inversely proportional to the stray inductance. The energy consumption, that is, the current through switch S1, is terminated if the momentary charge per on-pulse for switch S1 begins to exceed the value set by reference voltage $U_K$. After a predetermined gap period $T_g$, during which both switches S1 and S2 are OFF, switch S2 is turned on by pulse frequency modulator PFM and a charge proportional voltage $U_C$ determined by the on-pulse at switch S2 appears at integration capacitor CI. As before, switch S2 is now turned off as a function of reference voltage $U_K$. The gap period is selected to be at least long enough that during this time, the oscillating system composed of transformer Tr of the push-pull d.c. voltage converter together with rectifiers D6 and D7 in its secondary circuit and with parasitic, natural resonance determining elements, for example leads, and winding capacitance, is able to swing over on its own. The voltage across transformer Tr thus changes its polarity during gap period Tg. A more detailed description of the minimum gap period required for the setting process can be found in European Patent Application EP 77,958.B1 and its corresponding U.S. Pat. No. 4,443,840.

The current limitation effected per switching cycle operates until the situation of excess current is terminated. The two switches S1 and S2 are then switched on by pulses of identical length. None of the control pulses of switches S1 and S2 need be shortened since the voltage UC does not prematurely reach the magnitude of the reference voltage UK; that is, pulse frequency regulation is not effective for current limitation. A subminimum voltage protection device associated with the push-pull d.c. voltage converter, if required, is able to turn off switches S1 and S2 if the excess currents last for longer periods of time.

Figure 2:
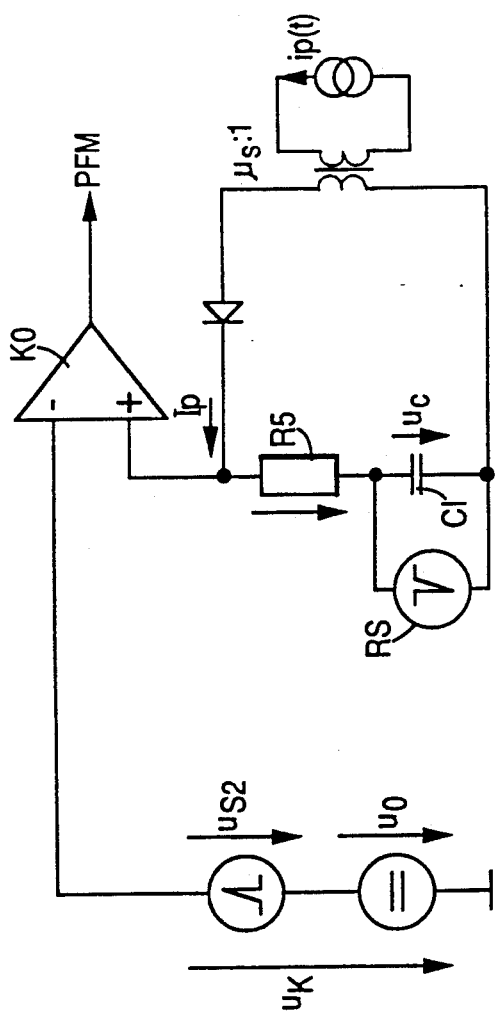
FIG. 2 is a circuit diagram of an equivalent circuit diagram for the signals fed to the comparator in FIG. 1.

The transfer function of the arithmetic mean of the output current Ia of the push-pull d.c. voltage converter for current limitation according to the invention can be derived with the aid of the equivalent circuit diagram shown in FIG. 2.

The following applies for voltage $U_C$:

$$U_C = \frac{1}{\ddot{u}_s \cdot C} \cdot \int_O^t i_{p(t)} dt$$

Where
C = capacitance of the integration capacitor CI;
$\ddot{u}_s$ = transformation ratio of the two current measurement converters SW1 and SW2;
$i_{p(t)}$ = momentary input current of the push-pull d.c. voltage converter.

The value of resistor $R_S$ has been neglected in this analysis.

With the voltage equation $$U_K = U_O + U_{SZ}$$

at comparator KO, the following applies:

$$U_K = \hat{U}_O + \frac{U_{SZ}}{T_{SZ}} \cdot t$$

where $$\frac{\hat{U}_{SZ}}{T_{SZ}}$$

represents the rise of the sawtooth voltage $\hat{U}_{SZ}$, with $U_{SZ}$ being the peak sawtooth voltage and $T_{SZ}$ being the rise time of the sawtooth voltage.

At the turn-off point $t = T_{on}$, where $T_{on}$ is the on-period of switch S1 and S2, respectively, $U_C$ can be set to equal $U_K$. With the above equations, the following then results:

$$\frac{1}{\ddot{u}_s \cdot C} \cdot \int_O^{T_{on}} i_{p(t)} dt = U_O + \frac{\hat{U}_{SZ}}{T_{SZ}} \cdot T_{on}$$

With $$\int_O^{T_{on}} i_{p(t)} dt = Q_P$$

where QP is the charge per turn-on pulse of one of switches S1, S2, and $$I_{ar} = \frac{Q_P}{T_{on} + T_g}$$

with $I_{ar}$ = arithmetic mean of the output current of the push-pull d.c. voltage converter, the following applies:

$$I_{ar} = \frac{\hat{u}_s \cdot C \cdot U_O}{T_g} \cdot \frac{1 + \frac{\hat{U}_{SZ}}{T_{SZ}} \cdot \frac{T_g}{U_O} \cdot \frac{T_{on}}{T_g}}{1 + \frac{T_{on}}{T_g}}$$

Using the dimensions $$\frac{U_{SZ}}{T_{SZ}} \cdot \frac{T_g}{U_O} = 1$$

the arithmetic mean $I_{ar}$ becomes independent of the ratio of on-time/off-time of switches S1 and S2 and independent of their switching frequencies and of the peak current value. Since $U_{SZ}$, $T_g$, $T_{SZ}$ and $U_O$ remain unchanged after the above setting, the current limitation according to the present invention operates such that the arithmetic mean $I_{ar}$ of the output current of the push-pull d.c. voltage converter remains constant, with the off-times of the two switches S1 and S2 being held constant.

Therefore, the following applies for $I_{ar}$:

$$I_{ar} = \frac{\hat{u}_s \cdot C \cdot U_O}{T_g}$$

With this type of current limitation, the characteristics will not exhibit any foldback behavior. The push-pull d.c. voltage converter operating with such a current limitation is even able to feed a load which exhibits current sink behavior.

Real switching circuits encounter unavoidable delays. Comparator KO and pulse frequency modulator PFM, for example, cause a signal delay of about 1 μs and the storage times of switches S1 and S2 also cause a signal delay of about 1 μs. This results in a total delay $T_S$. To compensate these delay times, the present invention adds a current proportional signal $$U_P = \frac{I_P}{\hat{u}_s} \cdot R_S$$

to the voltage $U_C$ across the comparator (FIG. 2), where $I_p$ is the rectified value of the current $i_{p(t)}$ and $R_S$ is the series resistance to capacitor CI. In deviation from the above analysis, the following then applies for the charge $Q_P$ per on-pulse:

$$Q_P = Q_{P1} + T_S \cdot I_{P(t=T_{on})}$$

$$Q_{P1} = \hat{u}_s \cdot C \left( U_O + \frac{\hat{U}_{SZ}}{T_{SZ}} \cdot T_{on} - \frac{I_{P(t=T_{on})} \cdot R_S}{\hat{u}_s} \right)$$

Thus, the following results:

$$I_{ar} = \frac{\hat{u}_s \cdot C \cdot U_O}{T_g} \cdot$$

$$\frac{1 + \frac{\hat{U}_{SZ} \cdot T_g}{T_{SZ} \cdot U_O} \cdot \frac{T_{on}}{T_g} + \left( \frac{T_S}{C \cdot R_S} - 1 \right) \cdot \frac{R_S}{\hat{u}_s \cdot U_O} \cdot I_{P(t=T_{on})}}{1 + \frac{T_{on}}{T_g} + \frac{T_S}{T_g}}$$

According to the above calculations, the term $$\frac{\hat{U}_{SZ} \cdot T_g}{T_{SZ} \cdot U_O}$$

is set to equal 1. If required, the term $$\left( \frac{T_S}{C \cdot R_S} - 1 \right)$$

may also be made to equal 0 by way of the dimensioning of $R_S$. This results in the simplified equation:

$$I_{ar} = \frac{\hat{u}_s \cdot C \cdot U_O}{T_g} \cdot \frac{1 + \frac{T_{on}}{T_g}}{1 + \frac{T_{on}}{T_g} + \frac{T_S}{T_g}}$$

Since $T_S/T_g$ is small, the arithmetic current mean $I_{ar}$ is almost independent of the ratio of on-time/off-time of switches S1 and S2, as evident also from the latter equation.

Figure 3:
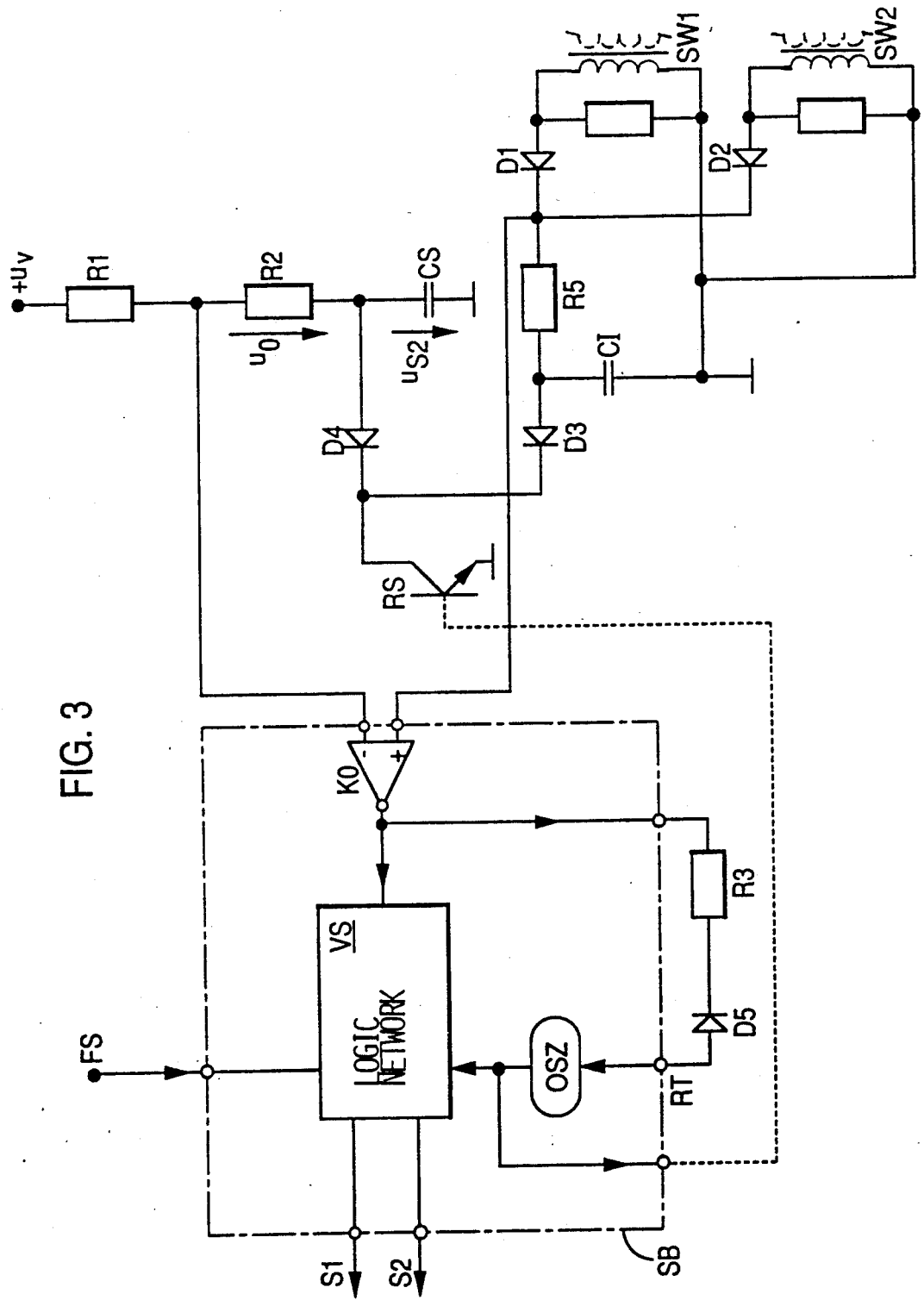
FIG. 3 is a circuit diagram for the comparator and the pulse frequency modulator in FIG. 1.

An advantageous embodiment of the connection of comparator KO and pulse frequency modulator PFM will now be described with referenced to FIG. 3.

A current source, realized by a supply voltage $U_V$ equipped with a resistor R1, is provided to generate the sawtooth voltage $U_{SZ}$ with which a capacitor CS is charged. A resistor R2 is connected in series with this capacitor CS and provides the required offset voltage $U_O$. Sawtooth voltage $U_{SZ}$ is small compared to supply voltage $U_V$, so that the path of the voltage across capacitor CS is linear in a good approximation. The discharging of capacitor CS and of integration capacitor CI is controlled by a transistor RS. If transistor RS is controlled to be conductive by a control pulse derived from pulse frequency modulator PFM to be described below, the potential carrying terminals of the two capacitors CI and CS are connected to ground relative to decoupling diodes D3 and D4, that is they are discharged.

A conventional switch controller module SB may be employed as pulse frequency modulator PFM, for example, the integrated circuit SG 1526 B made by Silicon General. This module SB, which is normally operated as a pulse width modulator, can be modified to operate as a pulse frequency modulator by resetting its internal oscillator OSZ by means of the output signal of comparator KO. Comparator KO is inverting so that the oscillator is reset by a LOW signal. This is done by way of the provision of an external resistor R3 and a decoupling diode D5 which are connected with the RT input of the oscillator. The output signal of the oscillator also provides the reset pulses for transistor RS.

The processing of the control pulses for switches S1 and S2 from the comparator output signal and from the oscillator signal under consideration of possible error signals FS from the switch controller, for example as the result of a subminimum voltage at the output, by way of logic networks VS which are part of the mentioned module SB can be found in the respective data sheets for the switch controller modules SB.

FIGS. 4A through 4I show the timing diagrams of the following signals:

The input current IE shown in FIG. 4A is a triangular current with a gap period Tg. The currents $I_{SW1}$ and $I_{SW2}$ respectively across the secondaries of current converters SW1 and SW2 are shown in FIGS. 4B and 4C. As can be seen these current pulses are alternate in view of their occurrence.

FIG. 4D shows the integration voltage $U_C$ derived from these currents $I_{SW1}$ and $I_{SW2}$. The output signal of comparator KO, as shown in FIG. 4E is normally HIGH. Only for the time when $U_K$ exceeds $U_O+U_{SZ}$ the output signal of comparator KO has a LOW pulse.

The oscillator output signal is shown in FIG. 4F. As can be seen the oscillator OSZ is reset by the LOW pulses of FIG. 4E. The two alternate output pulses $U_{S1}$ and $U_{S2}$ of pulse frequency modulator PFM — turn-on pulses for switches S1 and S2 respectively — are shown in FIGS. 4G and 4H. The reset pulses $U_{RS}$ for transistor RS, see FIG. 4I, are produced during the gap time Tg, where neither switch S1 nor switch S2 are conductive.

Obviously, numerous and additional modifications and variations of the present invention are possible in light of the above teachings. It is therefore to be understood that within the scope of the appended claims, the invention may be practiced otherwise than as specifically claimed.

What is claimed is:

1. In a push-pull d.c. voltage converter including a transformer with a primary winding connected to a d.c. power supply for receiving an input current and a secondary winding connected to a load by way of rectifiers for passing an output current through the load; first and second current paths leading to the primary winding of the transformer; and first and second push-pull switches disposed, respectively, in the first and second current paths, each switch having a controllable switching cycle; a method for limiting output current to the load, comprising:

generating a signal, in each of the first and second current paths which is a function of the input current;

integrating, by way of an integrating means, the signal in each of the first and second current paths, which is a function of the input current during each switching cycle of the controllable switches;

rapidly discharging the integrating means at the end of each conductive period of each of the push-pull switches; and forming a control signal from the integrated signal and feeding the control signal to a pulse frequency modulator which is connected for controlling the push-pull switches so that on-periods of the push-pull switches, in dependence on the integrated signal, cause the output current to have a constant arithmetic means and so that off-periods of the push-pull switches are kept constant.

2. A method as defined in claim 1, wherein said forming step includes comparing the integrated signal, by way of a comparator, with a sawtooth voltage which is offset with a direct voltage.

3. A method as defined in claim 1, wherein the transformer together with the rectifiers in the secondary of the transformer form an oscillating system, and said method further includes selecting the off-periods of the push-pull switches to be at least long enough so that during the off-periods the oscillating system of the transformer and its rectifiers is able to change polarity on its own.

4. A method as defined in one of claims 1, and further comprising adding a signal proportional to the input current to the integrated signal in order to compensate for delay times of components of the converter.

5. A push-pull d.c. voltage converter with current limitation, comprising:

a d.c. power supply;

a transformer having a primary winding connected to said power supply and receiving an input current therefrom, and a secondary winding connected to a load for passing an output current through the load;

first and second current paths leading to said transformer;

first and second push-pull switches disposed, respectively, in said first and second current paths, each said switch having a control input and a controllable switching cycle which is controllable by a signal received at said control input;

a current measuring converter disposed in each said current path, each said current measuring converter having an output for producing a signal proportional to the input current of the transformer;

an integration capacitor in communication with the outputs of said current measuring converters;

charging means for controlling the charging of said integration capacitor during each switching cycle of said push-pull switches;

discharging means, connected to said integration capacitor, for rapidly discharging said integration capacitor at the end of each conductive period of each of said push-pull switches;

a sawtooth signal means for producing a sawtooth signal with a superposed offset direct voltage;

a comparator having a first input connected with said integration capacitor, a second input connected with said sawtooth signal means and an output for producing an output signal corresponding to a voltage difference between signals present at the first and second inputs of said comparator;

a pulse frequency modulator means having an input connected to the output of said comparator and two outputs each connected to a respective one of the control inputs of said push-pull switches for controlling on-periods of said push-pull switches in dependence on the output signal of said comparator so that the output current through the load has a constant arithmetic means and so that off-periods of said push-pull switches are kept constant.

6. A converter as defined in claim 5, wherein said voltage supply comprises a boost type switch controller.

7. A converter as defined in claim 5, and further including a resistor connected in series with said integration capacitor, said resistor being connected for receiving a signal proportional to the input current of said transformer.

* * * * *